(12) United States Patent
Aikin

(10) Patent No.: US 11,544,863 B2
(45) Date of Patent: Jan. 3, 2023

(54) SYSTEMS AND METHODS FOR SURFACE MONITORING

(71) Applicant: Apple Inc., Cupertino, CA (US)

(72) Inventor: Randol W. Aikin, San Francisco, CA (US)

(*) Notice: Subject to any disclaimer, the term of this patent is extended or adjusted under 35 U.S.C. 154(b) by 236 days.

(21) Appl. No.: 17/092,821

(22) Filed: Nov. 9, 2020

(65) Prior Publication Data

US 2021/0065389 A1    Mar. 4, 2021

Related U.S. Application Data

(63) Continuation of application No. 15/762,413, filed as application No. PCT/US2016/052869 on Sep. 21, 2016, now Pat. No. 10,832,426.

(60) Provisional application No. 62/232,333, filed on Sep. 24, 2015.

(51) Int. Cl.
| | |
|---|---|
| G06K 9/00 | (2022.01) |
| G06T 7/40 | (2017.01) |
| G06V 20/56 | (2022.01) |
| G06V 20/58 | (2022.01) |
| H04N 5/225 | (2006.01) |

(52) U.S. Cl.
CPC ............ *G06T 7/40* (2013.01); *G06V 20/56* (2022.01); *G06V 20/58* (2022.01); *H04N 5/2256* (2013.01); *G06T 2207/30252* (2013.01)

(58) Field of Classification Search
CPC . G06T 7/40; G06T 2207/30252; G06V 20/56; G06V 20/58; H04N 5/2256
See application file for complete search history.

(56) References Cited

U.S. PATENT DOCUMENTS

| | | |
|---|---|---|
| 3,113,308 A | 12/1963 | Stavis |
| 3,833,906 A | 9/1974 | Augustine |
| 3,918,058 A | 11/1975 | Noyori et al. |
| 3,974,500 A | 8/1976 | Goldfischer |
| 4,050,071 A | 9/1977 | Clorfeine |
| 4,107,680 A | 9/1978 | Kaplan |

(Continued)

FOREIGN PATENT DOCUMENTS

| | | |
|---|---|---|
| CN | 101777253 | 7/2010 |
| EP | 2669633 | 12/2013 |

(Continued)

OTHER PUBLICATIONS

Baumgartner et al., "Acceleration-independent along-track velocity estimation of moving targets," IET Radar, Sonar, and Navigation, 2010, vol. 4, No. 3, pp. 474-487.

(Continued)

*Primary Examiner* — Xin Jia
(74) *Attorney, Agent, or Firm* — Polsinelli PC

(57) ABSTRACT

Implementations described and claimed herein provide systems and methods for surface monitoring. In one implementation, a target surface ahead of a vehicle is illuminated with light emitted from at least one light source. Image data of the target surface is captured from returns collected by at least one imager. At least one surface property of the target surface is measured using the image data. A set of friction metrics is generated from the at least one surface property. An estimated coefficient of friction for the target surface is determined from the set of friction metrics.

20 Claims, 6 Drawing Sheets

(56) References Cited

U.S. PATENT DOCUMENTS

| | | | |
|---|---|---|---|
| 4,170,006 A | 10/1979 | Falk | |
| 4,349,897 A | 12/1982 | Boehme et al. | |
| 4,414,548 A | 11/1983 | Carpenter et al. | |
| 4,641,349 A | 2/1987 | Flom et al. | |
| 4,653,316 A | 3/1987 | Fukuhara | |
| 4,781,465 A | 11/1988 | Demachi et al. | |
| 4,980,633 A | 12/1990 | Roskoni | |
| 5,061,932 A | 10/1991 | Tribe et al. | |
| 5,189,425 A | 2/1993 | Dabbs | |
| 5,204,682 A | 4/1993 | Beasley | |
| 5,579,012 A | 11/1996 | Iwakuni et al. | |
| 5,751,241 A | 5/1998 | Lewiner et al. | |
| 6,492,938 B1 | 12/2002 | Alland | |
| 6,606,052 B1 | 8/2003 | Miyahara | |
| 6,778,125 B1 | 8/2004 | Stewart et al. | |
| 7,421,334 B2 | 9/2008 | Dahlgren et al. | |
| 7,508,337 B2 | 3/2009 | Morinaga et al. | |
| 7,545,313 B2 | 6/2009 | Okamura et al. | |
| 8,063,797 B1 | 11/2011 | Sonnabend et al. | |
| 8,332,132 B2 | 12/2012 | Groenhuijzen et al. | |
| 8,599,062 B2 | 12/2013 | Szajnowski | |
| 8,718,861 B1 | 5/2014 | Montemerlo et al. | |
| 8,941,739 B2 | 1/2015 | Yoo | |
| 8,994,928 B2 | 3/2015 | Shiraishi | |
| 9,024,809 B2 | 5/2015 | Testar | |
| 9,863,928 B1* | 1/2018 | Peterson | G01N 33/42 |
| 10,247,816 B1 | 4/2019 | Hoffmann et al. | |
| 10,442,439 B1 | 10/2019 | Seo et al. | |
| 10,832,426 B2 | 11/2020 | Aikin | |
| 10,948,582 B1 | 3/2021 | Hoffmann et al. | |
| 2001/0054976 A1 | 12/2001 | Sauer | |
| 2001/0056327 A1 | 12/2001 | Jin | |
| 2002/0176608 A1 | 11/2002 | Rose | |
| 2004/0068359 A1 | 4/2004 | Neiss et al. | |
| 2005/0002558 A1 | 1/2005 | Franke et al. | |
| 2006/0232444 A1 | 10/2006 | Lee | |
| 2007/0090991 A1 | 4/2007 | Yoshikawa et al. | |
| 2007/0142996 A1 | 6/2007 | Lee | |
| 2008/0071465 A1 | 3/2008 | Chapman et al. | |
| 2008/0122680 A1 | 5/2008 | Morinaga et al. | |
| 2009/0116697 A1 | 5/2009 | Shalaby et al. | |
| 2009/0201193 A1 | 8/2009 | Hilsebecher et al. | |
| 2009/0271101 A1 | 10/2009 | Relyea et al. | |
| 2010/0017128 A1 | 1/2010 | Zeng | |
| 2010/0131145 A1 | 5/2010 | Ryu et al. | |
| 2010/0131146 A1 | 5/2010 | Nardi et al. | |
| 2010/0131229 A1 | 5/2010 | Nardi et al. | |
| 2010/0176921 A1 | 7/2010 | Frederick | |
| 2010/0250056 A1 | 9/2010 | Perkins | |
| 2011/0060478 A1 | 3/2011 | Nickolaou | |
| 2012/0323431 A1 | 12/2012 | Wong et al. | |
| 2013/0342692 A1 | 12/2013 | Li et al. | |
| 2014/0005932 A1 | 1/2014 | Kozak et al. | |
| 2014/0088860 A1 | 3/2014 | Poornachandran et al. | |
| 2014/0297092 A1 | 10/2014 | Delp | |
| 2014/0343842 A1 | 11/2014 | Ranganathan et al. | |
| 2015/0069224 A1* | 3/2015 | Yoshimura | G02B 5/04 |
| | | | 250/227.14 |
| 2015/0070207 A1 | 3/2015 | Millar et al. | |
| 2015/0285712 A1 | 10/2015 | Singh | |
| 2015/0291027 A1 | 10/2015 | Strasser et al. | |
| 2015/0334269 A1* | 11/2015 | Yokota | G08G 1/166 |
| | | | 382/103 |
| 2015/0344037 A1* | 12/2015 | Siegel | G06V 20/58 |
| | | | 73/9 |
| 2015/0369912 A1 | 12/2015 | Kishigami et al. | |
| 2016/0042644 A1 | 2/2016 | Velusamy | |
| 2016/0110997 A1 | 4/2016 | Ur et al. | |
| 2016/0133130 A1 | 5/2016 | Grimm et al. | |
| 2016/0133131 A1 | 5/2016 | Grimm et al. | |
| 2016/0209845 A1 | 7/2016 | Kojo et al. | |
| 2016/0274239 A1 | 9/2016 | Gupta et al. | |
| 2016/0321926 A1 | 11/2016 | Mayer et al. | |
| 2017/0010184 A1 | 1/2017 | Singh | |
| 2017/0219364 A1 | 8/2017 | Lathrop et al. | |
| 2017/0261315 A1* | 9/2017 | Yamaguchi | G06T 7/73 |
| 2017/0225688 A1 | 10/2017 | Milanese et al. | |
| 2017/0344010 A1 | 11/2017 | Rander et al. | |
| 2018/0015931 A1 | 1/2018 | Berntorp et al. | |
| 2018/0121833 A1 | 5/2018 | Friedman et al. | |
| 2018/0174454 A1 | 6/2018 | Tiwaree et al. | |
| 2018/0276832 A1 | 9/2018 | Aikin | |
| 2018/0276847 A1 | 9/2018 | Last et al. | |
| 2018/0283895 A1 | 10/2018 | Aikin et al. | |
| 2019/0107400 A1 | 4/2019 | Zavodny et al. | |
| 2021/0383569 A1 | 12/2021 | Last et al. | |

FOREIGN PATENT DOCUMENTS

| | | |
|---|---|---|
| EP | 2884299 | 6/2015 |
| GB | 2148651 | 5/1985 |
| WO | WO 2009/147406 | 12/2009 |
| WO | WO 2010/134824 | 11/2010 |
| WO | WO 2012/062764 | 5/2012 |
| WO | WO 2012/136494 | 10/2012 |
| WO | WO 2013/127666 | 9/2013 |
| WO | WO 2014/139821 | 9/2014 |
| WO | WO 2017/208670 | 12/2017 |

OTHER PUBLICATIONS

Condliffe, Jamie, "Road Trip Planner Lets You Choose A Route With the Best Weather." Jun. 19, 2012, https://gizmodo.com/5919495/5919495/road-trip-planner-lets-you-choose-a-route-with-the-best-weather, accessed Mar. 21, 2018.

Google Play, "Weather Route—FREE," App description, https://play.google.com/store/apps/details?id=com.voyagegames.weatherroute&hl=en, accessed Mar. 21, 2018.

Garun, Natt, "Weather Channel's road trip planner helps predict the forecast along your drive," Jun. 19, 2012, https://www.digitaltrends.com/home/weather-channels-road-trip-planner/, accessed Mar. 21, 2018.

App Store Preview, "inRoute Route Planner," Carob Apps, LLC, https://itunes.apple.com/us/app/inroute-intelligent-route/id703796787?mt=8, accessed Mar. 21, 2018.

Shen et al., "A Fast Alternative for Template Matching: An ObjectCode Method," 2013 Second IAPR Asian Conference on Pattern Recognition, IEEE, Nov. 5, 2013, pp. 425-429.

Nam, "Application of Novel Lateral Tire Force Sensors to Vehicle Parameter Estimation of Electric Vehicles," Sensors, 2015. vol. 15, pp. 28385-28401.

Coyle, John, "Jaguar Land Rover's 'Pothole Alert' Warns About Hated Hazard," Jun. 10, 2015, http://www.motorauthority.com/news/1098673_Jaguar-land-rovers-pothole-alert-warns-about-hated-hazard, accessed Sep. 12, 2016.

Revolta, Doug, "Pothole detection system showcased by Jaguar Land Rover," Jun. 17, 2015, http://www.autocar.co.uk/car-news/new-cars/pothole-detection-system-showcased-jaguar-land-rover, accessed Jun. 18, 2015.

Furgale et al., "Toward Automated Driving in Cities using Close-to-Market Sensors: An overview of the V-Charge project," 2013 IEEE Intelligent Vehicles Symposium (IV) Jun. 23-26, 2013, 8 pages.

Kozak et al., "Ranger: A Ground-facing Camera-based Localization System for Ground Vehicles," 2016 IEEE/ION Position, Location and Navigation Symposium (PLANS), Apr. 11, 2016, pp. 170-178.

Fang et al., "Ground-Texture-Based Localization for Intelligent Vehicles," IEEE Transactions on Intelligent Transportation Systems, vol. 10, No. 3, Sep. 2009, pp. 463-468.

* cited by examiner

SYSTEMS AND METHODS FOR SURFACE MONITORING

CROSS-REFERENCE TO RELATED APPLICATIONS

The present application is a continuation of U.S. application Ser. No. 15/762,413, filed Mar. 22, 2018, and entitled "Systems and Methods for Surface Monitoring," which a 371 of PCT Patent Application No. PCT/US2016/052869, filed Sep. 21, 2016, and entitled "Systems and Methods for Surface Monitoring," which claims priority under 35 U.S.C. § 119(e) to U.S. Provisional No. 62/232,333, filed Sep. 24, 2015, and entitled "Systems and Methods for Surface Monitoring." Each of these applications is specifically incorporated by reference in its entirety herein.

FIELD

Aspects of the present disclosure relate generally to road surface monitoring and more particularly to systems and methods for detecting low friction conditions in upcoming road surfaces.

BACKGROUND

Road surface conditions, such as ice patches, water puddles, road irregularities, and the like, are a consistent challenge for vehicles traveling on such surfaces. Conventionally, many vehicles are unable to detect and respond to such conditions in advance and instead merely assist the driver in regaining control of the vehicle once the dynamics of the vehicle are changing as a result of the road surface condition. For example, stability control systems, traction control systems, and the like facilitate recapture of vehicle control in low-traction event (e.g., a skidding event, a hydroplaning event, etc.) caused by a road surface condition. Detecting and avoiding road surface conditions, however, remains reliant on the driver, who may be prone to error and slow reaction time. It is with these observations in mind, among others, that various aspects of the present disclosure were conceived and developed.

SUMMARY

Implementations described and claimed herein address the foregoing problems by providing systems and methods for surface monitoring. In one implementation, a target surface ahead of a vehicle is illuminated with light emitted from at least one light source. Image data of the target surface is captured from returns collected by at least one imager. At least one surface property of the target surface is measured using the image data. A set of friction metrics is generated from the at least one surface property. An estimated coefficient of friction for the target surface is determined from the set of friction metrics.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology relate to systems and methods for surface monitoring. In one aspect, a road surface monitoring system includes an optical system mounted on a vehicle and configured to measure one or more surface properties of a target surface ahead of the vehicle on a road. The optical system illuminates and images the target surface with structured illumination, multiple wavelength bands, and/or polarized light to measure the surface properties of the target surface. The measured surface properties are used to generate a set of friction metrics for the target surface. For example, using structured illumination, a surface texture of the target surface may be measured and a surface profile generated. In addition or alternative to the surface profile, differential absorption of the multiple wavelength bands and polarization intensity may be measured and used to generate a surface type and a surface specularity, respectively, for the target surface. The friction metrics are used to determine an estimated coefficient of friction for the target surface. The coefficient of friction provides optimized information about the road to permit the driver and/or the vehicle to identify and proactively respond to road surface conditions, including low friction conditions that may cause, for example, a low-traction event.

The various systems and methods disclosed herein generally provide for the measurement of surface properties for road surface monitoring. The example implementations discussed herein reference the detection of low friction conditions of a road and adjusting an operation of a vehicle in response. However, it will be appreciated by those skilled in the art that the presently disclosed technology is applicable in other contexts, including, without limitation, road administration, identifying or monitoring road damage or degradation, altering a navigation path for one or more vehicles, and a variety of other scenarios involving the detection of road conditions and actions in response thereto.

Figure 1:
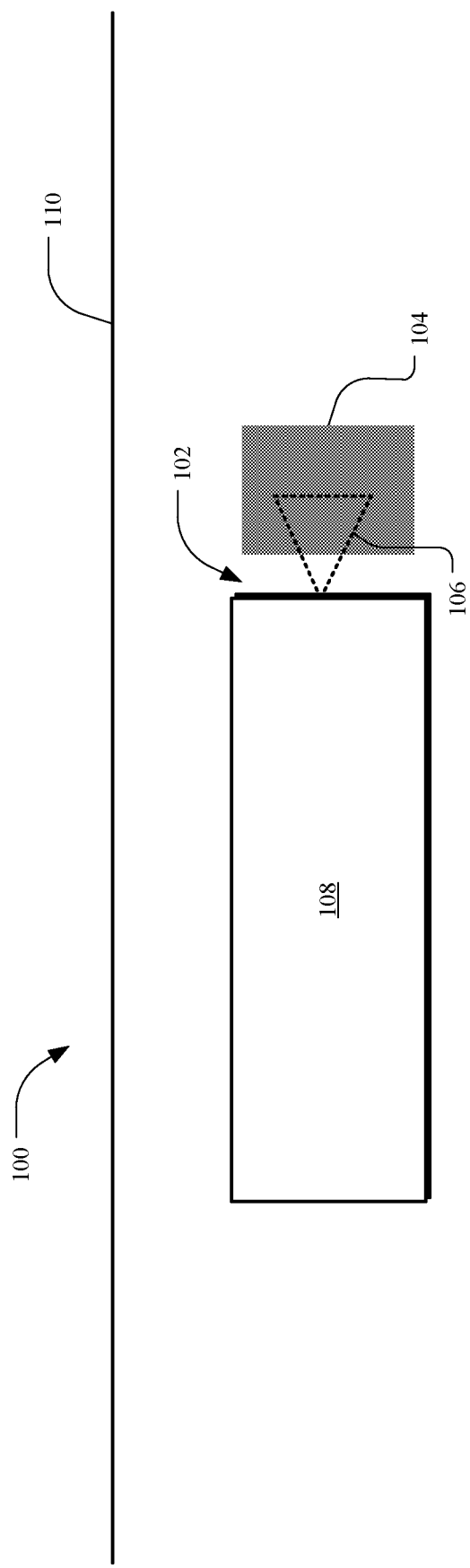
FIG. 1 is a diagram of an example road surface monitoring system.

To begin a detailed description of an example road surface monitoring system 100, reference is made to FIG. 1. In one implementation, a monitor 102 measures one or more surface properties of a target surface 104 with an optical system by illuminating the target surface 104 with light 106 and measuring the returns. It will be appreciated that the monitor 102 may be stationary or mobile. As can be understood from FIG. 1, for example, the monitor 102 may be mounted to a vehicle 108 to monitor the target surface 104 ahead of the vehicle 108 to provide information to a driver and/or the vehicle 108 regarding upcoming conditions of a road 110. The vehicle 108 may be a motor vehicle (e.g., a car, truck, all-terrain vehicle, motorbike, etc.) or a non-motorized vehicle (e.g., a bicycle, skateboard, etc.). Examples of the road 110 include, without limitation, a paved road, dirt road, bridge, sidewalk, trail, path, and the like.

During operation, friction between the vehicle 108 and the road 110 dictates a maximum acceleration, minimum stopping distance, and other control parameters of the vehicle 108. The friction between the vehicle 108 and the road 110 changes depending on a coefficient of friction of the road 110. For example, if the road 110 is dry, it will generally have a higher coefficient of friction than when it is wet. The coefficient of friction of the road 110 is the result of many factors, including, but not limited to, a composition of the road 110, a texture of the road 110, a presence of surface contaminants (e.g., loose materials or lubricants) on the road 110, and/or the like.

Thus, the monitor 102 measures surface properties of the target surface 104 from which the monitor 102 generates a set of friction metrics to determine an estimated coefficient of friction of the target surface 104. The set of friction metrics may include, without limitation, a surface profile, a surface type, and a surface specularity. To measure the surface properties of the target surface 104, the monitor 102 includes an optical system having at least one light source emitting the light 106 and at least one imager collecting the returns of the light 106 to capture image data of the target surface 104.

In one implementation, the optical system of the monitor 102 uses structured illumination to measure a surface texture of the target surface 104. Stated differently, the light 106 is structured light illuminating a narrow line at a fixed distance on the target surface 104, and the monitor 102 images the line offset by a baseline corresponding to a nominal road surface. The imaged line includes deviations due to variations in a height of the target surface 104. The monitor 102 uses these deviations and triangulation to reconstruct a surface texture of the target surface 104 from the image. More particularly, in one implementation, the monitor 102 measures the surface texture of the target surface 104 using a root-mean-square of the projected vertical position in the image and a third-dimension captured from the motion of the vehicle 108 along a path of travel towards the target surface 104.

The monitor 102 uses the surface texture of the target surface 104 to generate a surface profile of the target surface 104. In one implementation, the surface profile includes a micro-texture profile, a macro-texture profile, and/or a geometrical condition profile. The micro-texture profile identifies small scale surface texture (e.g., approximately 5 mm or below) of the target surface 104, a presence of any loose material on the target surface 104, any deformities in the target surface 104 (e.g., cracks, etc.), and/or the like. The macro-texture profile identifies a geometry of the target surface 104, such as a grade of the target surface 104 and/or the like. The geometric condition profile identifies any geometrical conditions on or in the target surface 104, such as a nail, a speed-bump, a pothole, and/or the like. Using the surface profile, the monitor 102 determines a coefficient of friction for the target surface 104 and/or detects any road surface conditions, such as low friction conditions (e.g., standing water, ice patches, etc.), geometrical conditions, and/or the like.

The monitor 102, however, may not be able to identify all road surface conditions using the surface profile. Thus, in some implementations, the monitor 102 measures a differential absorption and/or polarization of the target surface 104 to determine an overall surface type and a surface specularity to further identify road surface conditions and/or determine the coefficient of friction for the target surface 104.

In one implementation, the optical system of the monitor 102 uses multiple wavelength bands to measure a differential absorption of the target surface 104. Differential absorption occurs were the target surface 104 comprises one or more surface types that absorb and reflect the light 106 at different rates. More particularly, the monitor 102 illuminates the target surface 104 with the light 106 emitted at a plurality of emission wavelengths tuned to absorption features of at least one surface type and collects the relative backscatter from the emission wavelengths. Some of the surface types may absorb the light 106 while other surface types reflect it, so the amount of scattering of the light 106 that occurs indicates which surface types are present in the target surface 104.

Thus, using the differential absorption of the light 106 by the target surface 104, the monitor 102 determines an overall surface type of the target surface 104. The overall surface type may include one or more lubricant types (e.g., water, ice, oil, and/or other common surface lubricants), one or more road composition types (e.g., concrete, gravel, asphalt, cement, and/or other common road surface compositions), and/or other surface types. The surface types may correspond to low friction conditions, such that determination of the overall surface may be used by the monitor 102 to determine the coefficient of friction of the target surface 102 and/or detect road surface conditions.

In one implementation, the optical system of the monitor 102 emits the light 106 at a polarization angle and uses polarizers on a plurality of imagers to measure a relative intensity of backscatter polarized in at least one direction. More particularly, the light 106 may be linearly polarized or circularly polarized, with backscatter from the light 106 captured by the imagers. In one implementation, each photon of the light 106 emitted by the light source of the monitor 102 is linearly polarized in one direction (e.g., at a 45 degree angle), and the light 106 is backscattered by the target surface 104 through the polarizers to the imagers. The monitor 102 measures a relative intensity of the photons of the backscatter that are vibrating horizontally and of the photons that are vibrating vertically. In other words, the monitor 102 measures a relative intensity of horizontally and vertically polarized backscattered light from the target surface 104.

From the measured polarization, the monitor 102 determines a surface specularity of the target surface 104. Where the surface specularity of the target surface 104 is highly specular, a low friction condition (e.g., ice patch, steel plate, standing water, etc.) is likely present on the target surface 104. Conversely, where the surface specularity of the target surface 104 is Lambertian or otherwise relatively diffuse, as with pavement or similar road surface compositions, the target surface 104 may not include a low friction condition.

Using the set of friction metrics, including the surface profile, the overall surface type, and/or the surface specularity, the monitor 102 determines an estimated coefficient of friction of the target surface 104. In one implementation, the monitor 102 determines the coefficient of friction for a series of target surfaces 104 as the vehicle 108 moves along a path of travel on the road 110. The monitor 102 accumulates the friction metrics for the series of target surfaces 104 over time to provide a broad situational awareness of the conditions of the road 110. Stated differently, the monitor 102 determines an estimated overall coefficient of friction of the road 110 plus or minus a delta, which may indicate whether the road 110 likely has a less traction and/or is likely to include one or more road surface conditions. For example, the monitor 102 may determine that the road 110 may generally have a low coefficient of friction because it is covered in snow.

In addition or alternative to monitoring the estimated overall coefficient of friction of the road 110 to provide a broad situational awareness during travel, in one implementation, the monitor 102 detects isolated or acute road surface conditions on the road 110 using the set of friction metrics for the target surface 104. In either case, the monitor 102 may communicate with the various sub-systems of the vehicle 108 to control operation of the vehicle 108 accordingly or take other action. For example, the monitor 102 may automatically adjust operation of the vehicle 108 to reduce speed, increase following distance, adjust gain parameters in antilock brake control, and/or the like. Alternately or additionally, the monitor 102 may prompt the driver to manually adjust operation of the vehicle 108 accordingly.

In one implementation, the monitor 102 routes the vehicle 108 to avoid detected road surface conditions. The monitor 102 may communicate a location of any detected road surface conditions to a navigation system, which may share the location with various vehicles, to determine an optimal route. The monitor 102 may display the detected road surface conditions on a map in an output of a computer system (e.g., on a map displayed on a graphical user interface output on a display). Using the map, in one implementation, the driver may select a route based on suggestions accounting for the detected road surface conditions. In another implementation, the monitor 102 automatically determines an optimal route based on the detected road surface conditions and navigates the vehicle 108 to follow the optimal route. The actions described herein are exemplary only, and it will be appreciated that other actions may be taken in response to detected road surface conditions.

Figure 2:
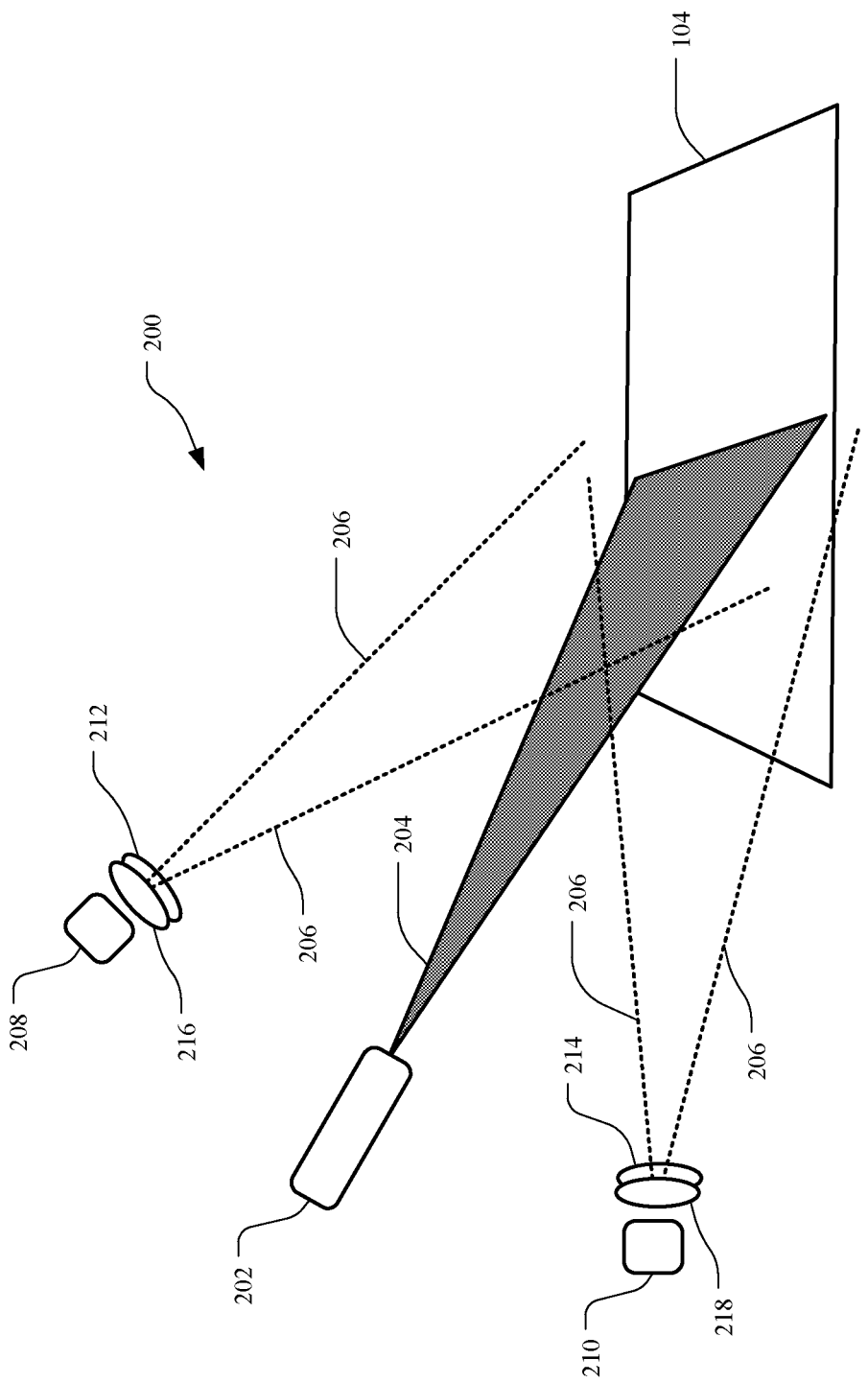
FIG. 2 illustrates an example optical system for measuring one or more surface properties of a target surface.

Referring to FIG. 2, an example optical system 200 for measuring one or more surface properties of the target surface 104 is shown. In one implementation, the optical system 200 includes at least one light source 202 configured to emit light 204 for illuminating the target surface 104 and at least one imager (e.g., imagers 208 and 210) configured to generate image data of the target surface 104 from returns 206 of the light 204 from the target surface 104. As detailed herein, the image data is used to measure surface properties of the target surface 104.

The returns 206 may pass through various optical elements, such as polarizers 212 and 214, filters 216 and 218, and/or the like, depending on the surface properties of the target surface 104 being measured using the optical system 200. Sunlight or other ambient light may create returns in the imagers 208 and 210, thereby contaminating the image data. To reject ambient light, in one implementation, the filters 216 and 218 are narrow-band filters with passbands (e.g., approximately 10 nm) matched to emission wavelengths of the light 204.

Alternatively or additionally, the imagers 208 and 210 may take back to back exposures of the target surface 104. The first exposure is with the light source 202 off, such that only ambient light is collected by the imagers 208 and 210. The second exposure includes the light 204 emitted by the light source 202. Using these two exposures, the ambient light is subtracted from the image data of the second exposure.

In one implementation, the light source 202 includes one or more lasers that emit the light 204 at a fan angle to illuminate a line 220 at a distance from the imagers 208 and 210 on the target surface 104. The light 204 may be structured light, such that the light 204 is transmitted at a fixed fan angle to illuminate the line 220 as a single, continuous line at a fixed distance on the target surface 104. Thus, in one implementation, the light source 202 projects the light 204 onto the target surface 104 with a wide beam width in a horizontal direction along the line 220 and a narrow beam width in a vertical direction transverse to the line 220, thereby painting a narrow, continuous line 220 on the target surface 104.

The imagers 208 and 210 include imaging sensors (e.g., monocolor complementary metal-oxide-semiconductor (CMOS) imagers or other cameras) with a field of view (e.g., a 30 degree horizontal field of view) that capture the returns 206 of the illuminated line 220 to generate image data of the target surface 104. Stated differently, the light source 202 illuminates the line 220 on the target surface 104 with the light 204, and the imagers 208 and 210 image the line 220.

The orientation parameters of the light source 202, the imagers 208 and 210, and/or other optical elements may be tunable or preset depending on desired resolution of the image data and processing time of the monitor 102. The resolution is defined by a minimum displacement that the optical system 200 can measure on the target surface 104 with a certain level of confidence. In one implementation, to capture image data at such a resolution of the target surface 104 while the vehicle 108 is in motion, an exposure time of the imagers 208 and 210 is short. Longer exposure times may result in any structure in the target surface 104 shorter than the minimum displacement blurring in the image data captured by the imagers 208 and 210.

Further, the resolution drives a separation between the light source 202 and the imagers 208 and 210, as well as an illumination range defined by the distance between the imagers 208 and 210 and the line 220 on the target surface 104. For example, if the light 204 is propagated at a larger illumination range, there will be less signal return, but there will also be a smaller angular displacement captured in the image data by the imagers 208 and 210 for the same physical displacement on the target surface 104.

Similarly, the fan angle of the light 204, corresponding to an opening angle of the light source 202, is dictated by the resolution and an amount of the target surface 104 to measure. A larger fan angle will dilute a power of the light 204 illuminating the line 220 on the target surface 104, but more of the target surface 104 will be measured. Conversely, a smaller fan angle will illuminate the line 220 on the target surface with a higher intensity, but will measure less of the target surface 104. Stated differently, a larger fan angle emits the light 204 with a wider beam width in the horizontal direction along the line 220 with diluted power, decreasing resolution, and a smaller fan angle emits the light 204 with a narrower beam width in the horizontal direction along the line 220 with higher intensity power, increasing resolution. In one implementation, the fan angle is fixed at approximately thirty degrees. But it will be appreciated that other angles are contemplated.

The orientation parameters are further driven by the processing time of the monitor 102, which corresponds to how far in advance the set of friction metrics are needed to determine the estimated coefficient of friction of the target surface, detect road surface conditions on the target surface 104, and/or control the vehicle 108 accordingly. Stated differently, the target surface 104 may be positioned far enough down the road 110 from the monitor 102 there is sufficient time for the monitor 102 to detect and respond to any road surface conditions but not so far as to decrease an accuracy of the detection. Where the monitor 102 is configured to detect and avoid acute road surface conditions, the processing time is short, particularly where the vehicle 108 is moving at high speeds. On the other hand, if the monitor 102 is analyzing the road 110 for a broad situational awareness of conditions or the vehicle 108 is traveling at relatively slow speeds, the processing time may tolerate a latency. These considerations generally dictate the illumination range of the light source 202. A separation of the imagers 208 and 210, among other orientation parameters, may depend on the illumination range needed to achieve a desired processing time of the monitor 102. For example, a larger illumination range (e.g., 30 meters) may need a larger separation of the imagers 208 and 210, while the imagers 208 and 210 may have a smaller separation with a smaller illumination range.

The imagers 208 and/or 210 image the line 220, offset by a baseline. Image data of the line 220 is captured by the imagers 208 and/or 210 from the returns 206. In one implementation, deviations in a height of the target surface 104 due to surface texture results in deviations in the apparent centroid of the line in the imagers 208 and/or 210. In other words, any vertical displacement of the target surface 104 will be captured as lateral or angular displacement on the imagers 208 and 210.

In one implementation, micro-texture of the target surface 104 is reconstructed from the image data using triangulation. Three dimensions of the micro-texture of the target surface 104 are thus captured with: the triangulation providing one dimension as a projected vertical position; a baseline of the light beam width along the line 220, which is constant, providing the second dimension; and the lateral motion of the vehicle 108 along the path of travel providing the third dimension. By taking the root-mean-square (RMS) of the projected vertical position in the image data, the monitor 102 measures the micro-texture of the target surface 104.

It will be appreciated that other measures of micro-texture of the target surface 104 that are robust to occlusion and surface irregularities may be utilized in alternative or addition to RMS. For example, the micro-texture may be measured by taking a surface height of the target surface 104 as a function of spatial scale, represented as a spatial power spectral density. Moreover, various masks and/or filters may be applied to the projected vertical position in the image data prior to taking the RMS.

The macro-texture of the target surface 104 and/or the presence of any geometrical conditions on the target surface 104 may additionally be measured from the image data. In one implementation, the macro-texture is measured using the fixed width of the light 204. Due to the fixed width of the light 204, the line 220 will be smaller or larger in length depending on the macro-texture of the target surface 104 and will displace along the imager 208 and/or 210. Using this information, the monitor 102 measures the macro-texture of the target surface 104. In one implementation, an overall slope of the projected vertical position in the image data is used to measure a surface grade of the target surface 104 in the lateral direction. The monitor 102 compares the overall slope to an inertial measurement unit of the vehicle 108 to account for body roll of the vehicle 108, thereby enabling an accurate measurement of the surface grade of the target surface 104.

The presence of any geometrical conditions would appear in the image data as a booming signal-to-noise ratio. In one implementation, a geometrical condition may have reflective properties that are different than the target surface 104. Such reflective properties appear as bright or dim features in the image data. The monitor 102 detects the presence of a geometrical condition by identifying bright or dim features in the image data. In another implementation, any geometrical conditions that vertically protrude or recede from the target surface 104 causes a relatively large displacement of the projected vertical position of the line 220 relative to the target surface 104. The monitor 102 detects the presence of a geometrical condition based on this displacement.

The measured surface texture of the target surface 104 thus includes the measured micro-texture, macro-texture, and/or geometrical conditions. Using the measured surface texture, the monitor 102 generates a surface profile of the target surface 104.

As described herein, differential absorption, polarizations, and/or other surface properties of the target surface 104 may be measured in addition or alternative to the surface texture. In one implementation, the light sources 202 emit the light 204 at a plurality of emission wavelengths onto the target surface 104 and the returns 206 include a backscatter from the wavelengths. The imagers 208 and 210 measure the differential absorption by measuring the relative intensities of the returns 206 at the wavelengths. More simply, the light sources 202 paint the light 204 on the target surface 104 in different colors, and the imagers 208 and 210 measure the relative intensities of the backscatter from the different colors.

In one implementation, the different emission wavelengths of the light 204 are tuned to absorption features of surface types, such as lubricants, road composition types, and/or the like. The lubricants may be, without limitation, water, ice, oil, and/or other common surface lubricants, and the road composition types may be, without limitation, concrete, gravel, asphalt, cement, and/or other common road surface compositions. By tuning the light 204 to strong absorption profiles of one or more surface types, the measured differential absorption of the target surface 104 of the bands may be used to identify a surface type for the target surface 104.

In one implementation, the light source 202 emits the light 204 at a polarization angle and uses the polarizers 212 and 214 (e.g., linear polarizers) on the imagers 208 and 210 to measure a relative intensity of backscatter polarized in at least one direction. More particularly, each photon of the light 204 is linearly polarized in one direction (e.g., at a 45 degree angle), and the returns 206 include vertically and horizontally polarized backscattered light propagated through the linear polarizers 212 and 214 to the imagers 208 and 210. The monitor 102 measures the polarization by measuring a relative intensity of horizontally and vertically polarized backscattered light 206 and distinguishing between specular reflections and diffuse reflections. Using this information, the monitor 102 determines a surface specularity of the target surface 104 including whether any highly specular surfaces often indicative of road conditions are present.

Figure 3:
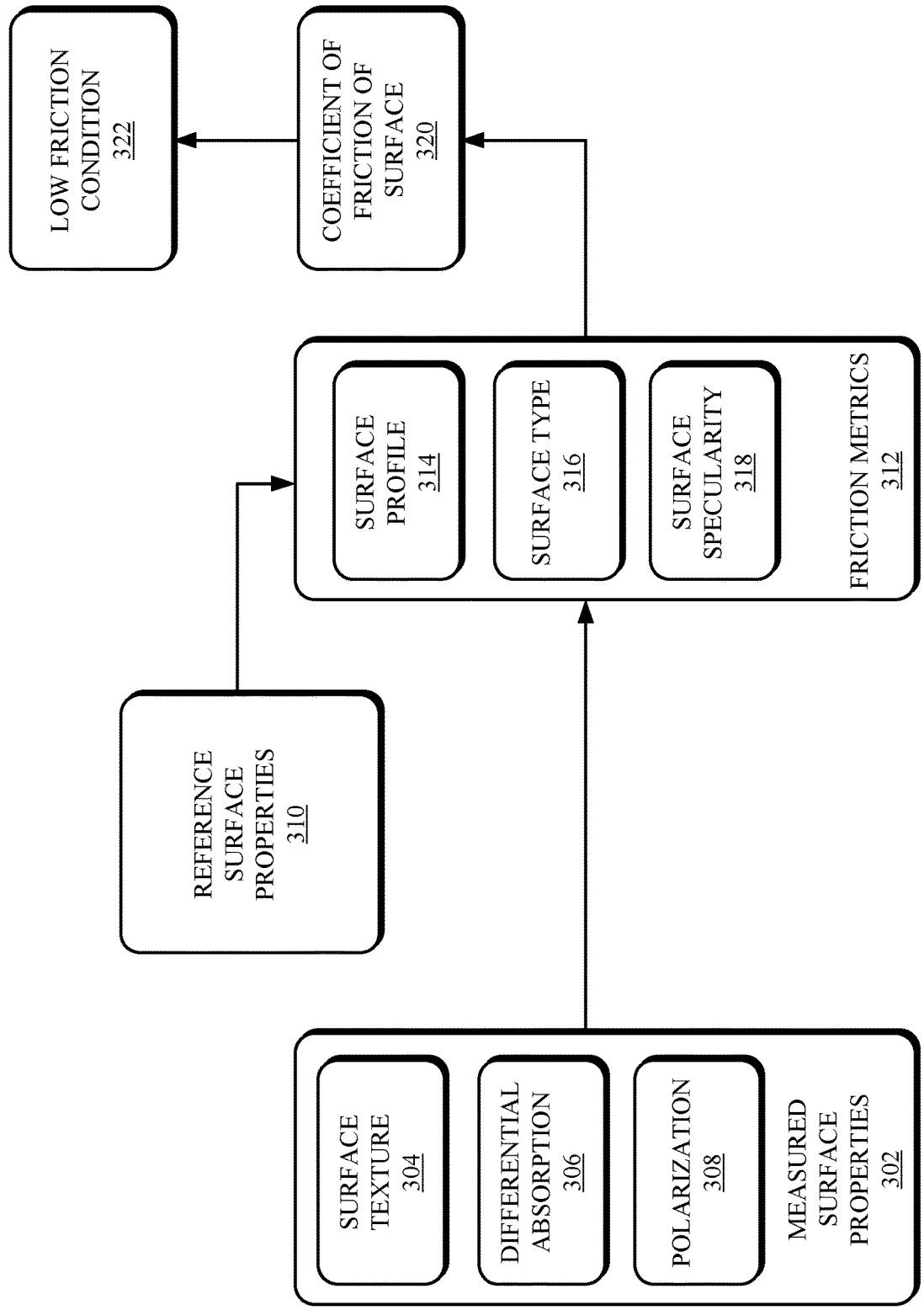
FIG. 3 is a block diagram of an example system for surface monitoring of a road.

Turning to FIG. 3, a block diagram of an example system 300 for surface monitoring of a road is shown. In one implementation, the monitor 102 measures at least one surface property of the target surface 104 to obtain measured surface properties 302, including, but not limited to, surface texture 304, differential absorption 306, polarization 304, and/or the like. The measured surface properties 302 may be obtained using the optical system 200, for example, as described with respect to FIG. 2 and elsewhere herein. Using the measured surface properties 302, the monitor 102 generates a set of friction metrics 312, including, without limitation, a surface profile 314, a surface type 316, a surface specularity 318, and/or the like. Based on the set of friction metrics 312, the monitor 102 may determine a coefficient of friction 320 of the target surface 104 and/or detect a low friction condition 322 or other road surface condition.

In one implementation, the set of friction metrics 312 are generated based on a comparison of the measured surface properties 302 to reference surface properties 310, which may be in the form of a reference model, baseline, lookup table, and/or the like. The reference surface properties 310 may be constructed from data previously collected on the target surface 104 by the monitor 102. In this way, changes, for example, due to geometric conditions, lubricants, road damage, and/or the like, may be detected by the monitor 102 via direct comparison to previously collected data.

The coefficient of friction 320 of the target surface 104 may be determined using a reference model, baseline, lookup table, and/or the like. In one implementation, the set of friction metrics 312 are input into a reference model derived from surface characterization measurements. The reference model generates an estimate of the coefficient of friction 320 based on the set of friction metrics 312. In another implementation, a regression model is constructed using a training data set and machine learning techniques.

Machine learning generally refers to a machine learning through observing data that represents incomplete information about statistical happenings and generalizing such data to rules and/or algorithms that make predictions for future data, trends, and the like. Machine learning typically includes "classification" where machines learn to automatically recognize complex patterns and make intelligent predictions for a class. Here, the training data set would consist of some or all of the measured surface properties 302 and a direct measure of road friction obtained, for example, using a road friction measurement trailer, a friction pendulum, or the like. The regression model is constructed using machine learning to generate a ground truth, which corresponds to the road friction given the measured surface properties 302. The monitor 102 uses the regression model to estimate the coefficient of friction 320 of the target surface 104 given the same measured surface properties 302, with characterized statistical uncertainties.

In one implementation, the monitor 102 includes a baseline that the road 110 overall comprises surfaces that are generally smooth with a spatial scale of the road structure being relatively large. If the target surface 104 includes a substantially flat surface, for example where the target surface 104 includes standing water, the surface texture 304 will be a straight line in the image data. Where the target surface 104 includes more vertical structure, such as with pavement, the surface texture 304 will include deviations in the image data, as described herein. Different surfaces will have different surface textures. In one implementation, the reference surface properties 310 include a model with surface texture profiles for various potential surfaces. The monitor 102 may compare the surface texture 310 to the surface texture profiles to determine the surface profile 314 of the target surface 314.

For example, the surface profile 314 may be generated based a comparison of the measured surface properties 302 and the reference surface properties 310 in the power spectrum space and/or in frequency space. If the target surface 104 has lumps but is otherwise smooth (i.e., has macro-texture but little micro-texture), the surface texture 304 includes lower power in the power spectrum, which may be matched to a surface texture profile to generate the surface profile 314 specifying that the target surface 104 is a nominal road surface. On the other hand, the surface texture 304 may have a higher power in the power spectrum with very low fluctuation power at low frequencies, which when matched to a surface texture profile generates the surface profile 314 specifying that the target surface 104 includes large amounts of micro-texture, for example, in the case of sand on the target surface 104. Where the target surface 104 is smooth even at small scales, as measured in frequency space, a comparison of the surface texture 304 to the surface texture profile may indicate that the target surface 104 includes water or another lubricant or fluid.

The coefficient of friction 320 may be similarly determined using a reference model, baseline, lookup table, and/or the like. For example, if the surface texture 304 includes a certain root-mean-square vertical fluctuation power between angular scales of one degree to two arc minutes, the monitor 102 may assign the coefficient of friction 320 for the target surface 104 a certain value as dictated by a reference model or the like. The monitor 102 may determine the coefficient of friction 320 through such comparisons in a variety of ways, including, but not limited to, in power spectrum space in frequency space, using the root-mean-square of the vertical position of the surface texture 304, applying spatial filters (e.g., low pass, high pass butterworts, etc.), and/or the like.

In one implementation, the surface texture 304 is obtained by measuring a vertical position of the target surface 104 as a function of the horizontal position on the imager 208 and/or 210, as described herein. A spatial filter may then be applied to the data, and the root-mean-square of the vertical position is calculated, as described herein, to obtain the surface texture 304. The application of the filter to the surface texture 304 permits the monitor 102 to probe the surface texture 304 at different scales to generate the surface profile 314. For example, with the application of a high pass filter (e.g., a butterworth filter), vertical fluctuations in the surface texture 304 may be analyzed at small scales, and with the application of a low pass filter, the surface texture 304 may be analyzed at larger scales.

The coefficient of friction 320 may alternatively be generally estimated based on a comparison of the surface profile 314 of the target surface 104 to that of other surfaces measured along the path of travel of the vehicle 108 along the road 110. Stated differently, where the surface profile 314 has consistent power spectra of the road 110 and the target surface 104 indicates a change in the power spectrum measured for the target surface 104, the monitor 102 may estimate a corresponding change in the coefficient of friction 320. For example, the surface profile 314 may consistently indicate surfaces on the road 110 having textures consistent with gravel and the coefficient of friction 320 corresponding thereto. If the surface profile 314 changes with the target surface 104 to indicate sand or something else with small structure on the road 110, the monitor 102 may determine the coefficient of friction 320 decreases at the target surface 104. Similarly, if the surface profile 314 consistently indicates nominal road surfaces (e.g., pavement) on the road 110 and the surface profile 314 for the target surface 104 indicates that surface structure has substantially vanished, standing water or another fluid is present on the target surface 104, so the coefficient of friction 320 of the target surface 104 is lower.

In one implementation, the reference surface properties 310 include a baseline, lookup table, and/or reference profile characterizing various surface types, which can be used as a discrimination tool for determining the surface type 316 of the target surface 104 from the differential absorption 306. For example, the reference surface properties 310 may include a reference profile for identifying wet pavement, icy concrete, and/or other lubricant types and road surface composition types alone or in combination. In one implementation, if the light sources 202 are tuned to an absorption spectrum of a surface type, such as water, then the relative intensities of the imagers 208 and 210 will change with the imager 208 becoming brighter and the imager 210 becoming dimmer, for example, depending on the spectral features targeted with the light 204. For water, two bands may be illuminated by the light sources 202 with the relative intensities of the two bands captured from the returns 206 being distinguished. The coefficient of friction 320 may be determined or inferred from the surface type 316 and/or low friction conditions 322 detected from the surface type 316 similar to the systems and methods described above with respect to the surface profile 314.

Similarly, in one implementation, the reference surface properties 310 include a baseline, lookup table, and/or reference profile characterizing specularity values for various surfaces, which can be used as a discrimination tool for determining the surface specularity 318 of the target surface 104 from the polarization 308. Surfaces corresponding to common low friction conditions 322 are generally specular where common road surfaces are generally Lambertian or otherwise diffuse. For example, ice, water, metal plates, and the like are highly specular where sand, gravel, pavement, and the like are highly diffuse. The polarization 308 will include nominal intensities where the returns 206 from the target surface 104 include Lambertian or diffuse scattering. Thus, as the vehicle 108 travels down the road 110, the surface specularity 318 will correspond to pavement with the polarization 308 being largely diffuse with some relative intensities. If the target surface 104 includes ice, the returns 206 will include a decrement in one of the two polarization states (vertical and horizontal) with the relative intensities measured by the imagers 208 and 210 changing dramatically, and the surface specularity 318 will detect a highly specular surface on the target surface 104 indicative of ice. The coefficient of friction 320 may be determined or inferred from the surface specularity 318 and/or low friction conditions 322 detected from the surface specularity 318 similar to the systems and methods described above with respect to the surface profile 314.

Figure 4:
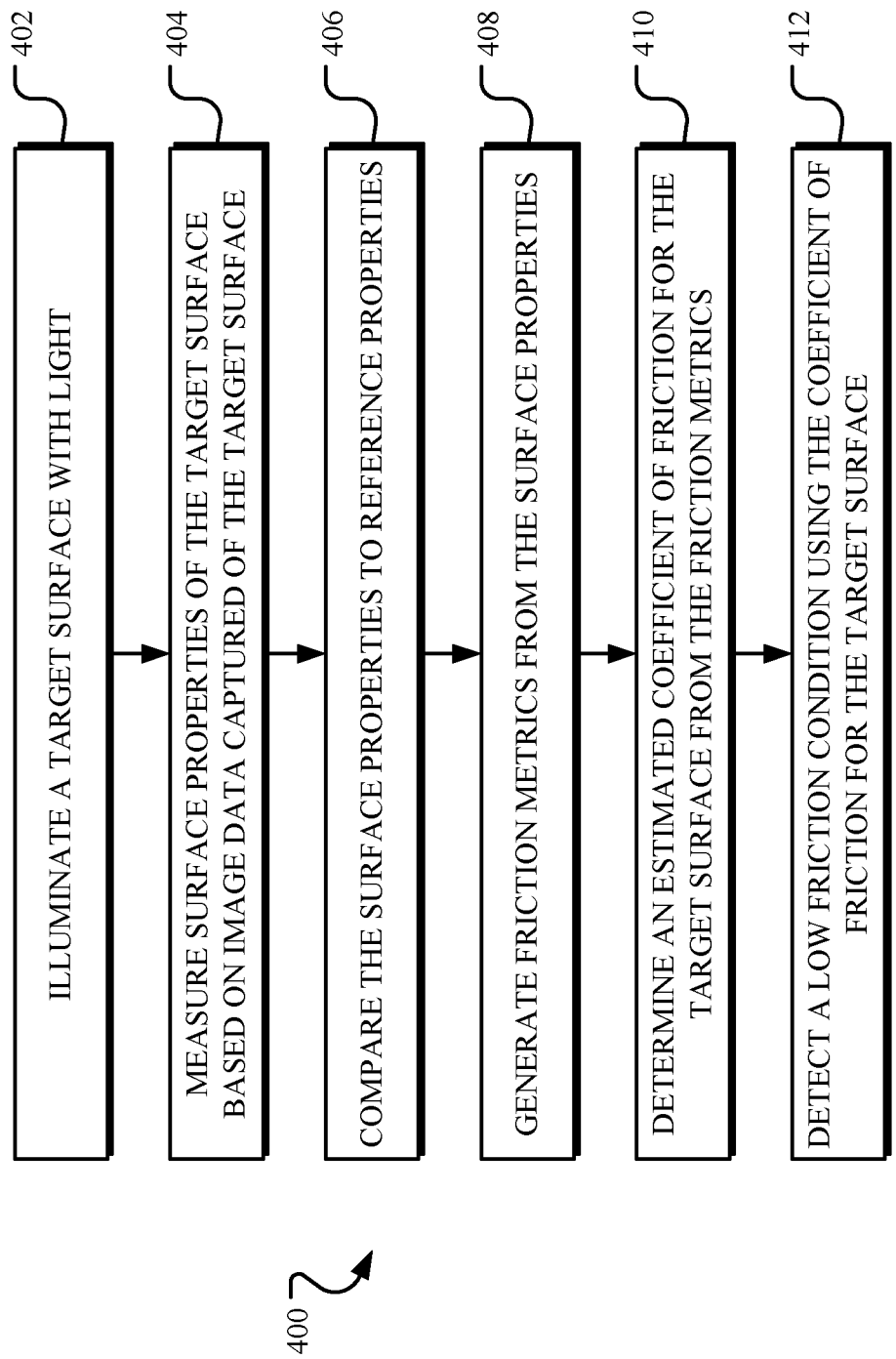
FIG. 4 illustrates example operations for surface monitoring of a road.

FIG. 4 illustrates example operations 400 for surface monitoring of a road. In one implementation, an operation 402 illuminates a target surface ahead of a vehicle with light emitted from at least one light source, and an operation 404 measures at least one surface property of the target surface using image data captured of the target surface from returns collected by at least one imager. An operation 406 may compare the at least one surface property to a set of reference surface properties. An operation 408 generates a set of friction metrics from the at least one surface property. In one implementation, the operation 408 generates the set of friction metrics based on the operation 406. As described herein, the set of friction metrics may include a surface profile, a surface type, and/or a surface specularity.

In one implementation, the operation 402 illuminates a continuous line at a fixed distance on the target surface with structured light emitted from the at least one light source at a fixed fan angle. The operation 404 measures a surface texture of the target surface using image data of the continuous line, and using the surface texture, the operation 408 generates the surface profile of the target surface. The surface profile may include a micro-texture, a macro-texture, or a geometrical object.

Additionally or alternatively, in one implementation, the operation 402 illuminates the target surface with light emitted at a plurality of emission wavelengths tuned to absorption features of at least one surface type, such as a lubricant, road composition type, and/or the like. The operation 404 measures a differential absorption of the light by the target surface using image data captured based on a relative backscatter of the plurality of emission wavelengths from the target surface. Using the differential absorption, the operation 408 determines the surface type of the target surface.

Additionally or alternatively, in one implementation, the operation 402 illuminates the target surface with polarized light. The operation 404 measures a relative intensity of backscattered light polarized in at least one direction (e.g., vertically or horizontally) using image data captured based on backscatter of the polarized light from the target surface propagated through at least one polarizer and collected by the at least one imager. Using the relative intensity of the polarized backscattered light, the operation 408 determines the surface specularity of the target surface.

In one implementation, an operation 410 determines an estimated coefficient of friction for the target surface from the set of friction metrics. An estimated coefficient of friction for the road may be determined based on an accumulated set of friction metrics including the estimated coefficient of friction for the target surface. Alternatively or additionally, an operation 412 may detect a low friction condition ahead of the vehicle using the coefficient of friction for the target surface. In either case, an operation of the vehicle may be adjusted accordingly.

Figure 5:
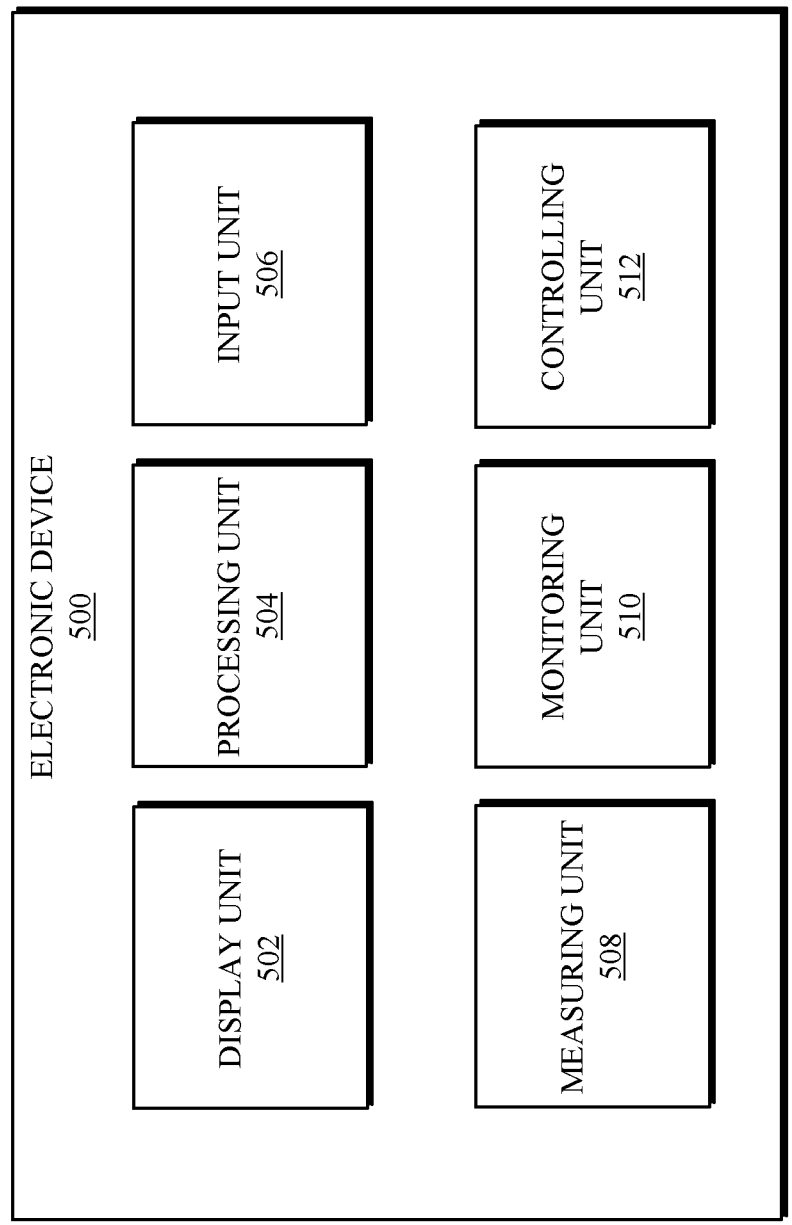
FIG. 5 is a functional block diagram of an electronic device including operational units arranged to perform various operations of the presently disclosed technology.

Turning to FIG. 5, an electronic device 500 including operational units 502-512 arranged to perform various operations of the presently disclosed technology is shown. The operational units 502-512 of the device 500 are implemented by hardware or a combination of hardware and software to carry out the principles of the present disclosure. It will be understood by persons of skill in the art that the operational units 502-512 described in FIG. 5 may be combined or separated into sub-blocks to implement the principles of the present disclosure. Therefore, the description herein supports any possible combination or separation or further definition of the operational units 502-512.

In one implementation, the electronic device 500 includes a display unit 502 to display information, such as a graphical user interface, and a processing unit 504 in communication with the display unit 502 and an input unit 506 to receive data from one or more input devices or systems, such as the optical system 200. Various operations described herein may be implemented by the processing unit 504 using data received by the input unit 506 to output information for display using the display unit 502.

Additionally, in one implementation, the electronic device 500 includes a measuring unit 508, a monitoring unit 510, and a controlling unit 512. The measuring unit 508 measures at least one surface property of a target surface ahead of a vehicle using the image data captured from returns collected by at least one imager using light illuminating the target surface. The light is emitted from at least one light source. The monitoring unit 510 determines an estimated coefficient of friction for the target surface from a set of friction metrics generated from the at least one surface property, and the controlling unit 512 controls an operation of the vehicle based on the estimated coefficient of friction.

In another implementation, the electronic device 500 includes units implementing the operations described with respect to FIG. 4. For example, the operation 404 may be implemented by the measuring unit 508, and the operations 406-412 may be implemented by the monitoring unit 510. The monitoring unit 510 may include various other units each implementing one of the operations 406-412. For example, the monitoring unit 510 may include a comparing unit for implementing the operation 406, a generating unit for implementing the operation 408, a determining unit for implementing the operation 410, and a detecting unit for implementing the operation 412. In some implementations, the controlling unit 512 implements various operations for controlling the operation of a vehicle based on the operations implemented by the monitoring unit 510. In one implementation, the controlling unit 512 determines a route path for a vehicle based on the operations implemented by the monitoring unit 510 and associated with location information for the vehicle at a particular time. In another implementation, the controlling unit 512 adjusts an operation of the vehicle based on the operations implemented by the monitoring unit 510.

Figure 6:
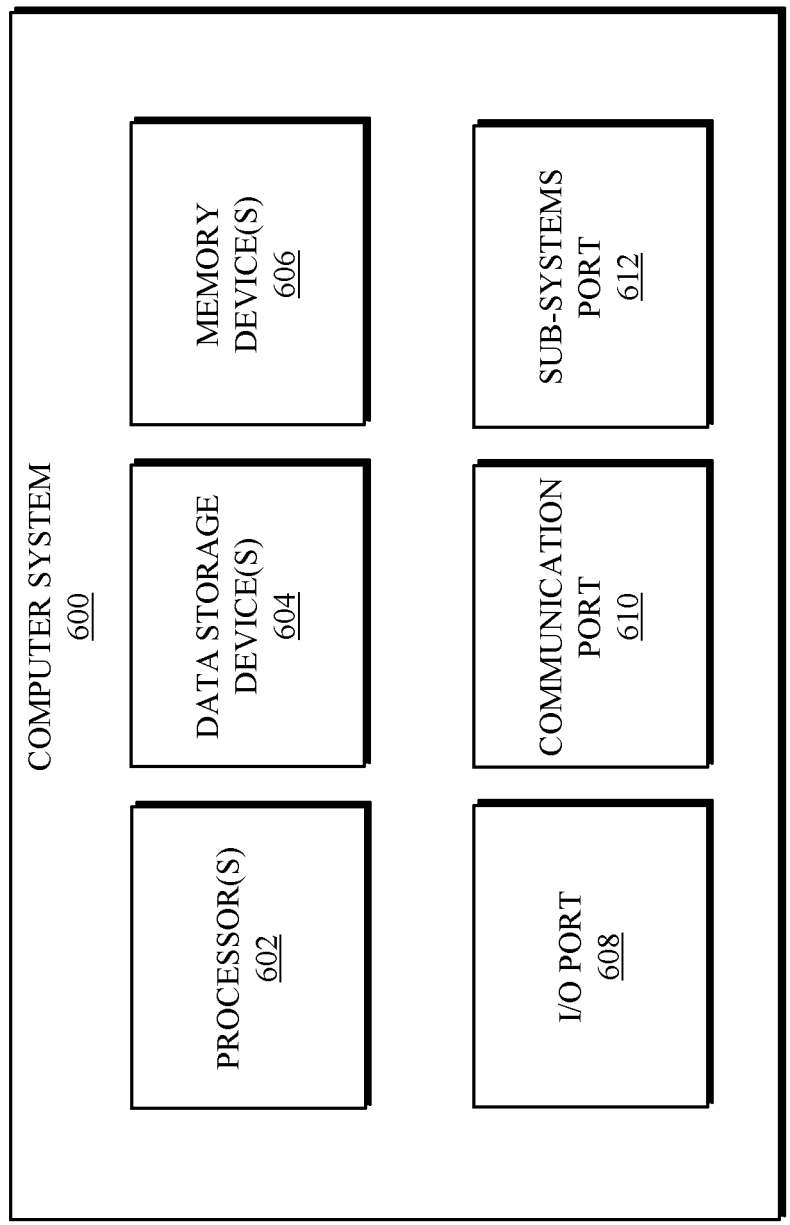
FIG. 6 is an example computing system that may implement various systems and methods of the presently disclosed technology.

Referring to FIG. 6, a detailed description of an example computing system 600 having one or more computing units that may implement various systems and methods discussed herein is provided. The computing system 600 may be applicable to the measuring system 102 and other computing or network devices. It will be appreciated that specific implementations of these devices may be of differing possible specific computing architectures not all of which are specifically discussed herein but will be understood by those of ordinary skill in the art.

The computer system 600 may be a computing system is capable of executing a computer program product to execute a computer process. Data and program files may be input to the computer system 600, which reads the files and executes the programs therein. Some of the elements of the computer system 600 are shown in FIG. 6, including one or more hardware processors 602, one or more data storage devices 604, one or more memory devices 608, and/or one or more ports 608-612. Additionally, other elements that will be recognized by those skilled in the art may be included in the computing system 600 but are not explicitly depicted in FIG. 6 or discussed further herein. Various elements of the computer system 600 may communicate with one another by way of one or more communication buses, point-to-point communication paths, or other communication means not explicitly depicted in FIG. 6.

The processor 602 may include, for example, a central processing unit (CPU), a microprocessor, a microcontroller, a digital signal processor (DSP), and/or one or more internal levels of cache. There may be one or more processors 602, such that the processor 602 comprises a single central-processing unit, or a plurality of processing units capable of executing instructions and performing operations in parallel with each other, commonly referred to as a parallel processing environment.

The computer system 600 may be a conventional computer, a distributed computer, or any other type of computer, such as one or more external computers made available via a cloud computing architecture. The presently described technology is optionally implemented in software stored on the data stored device(s) 604, stored on the memory device(s) 606, and/or communicated via one or more of the ports 608-612, thereby transforming the computer system 600 in FIG. 6 to a special purpose machine for implementing the operations described herein. Examples of the computer system 600 include personal computers, terminals, workstations, mobile phones, tablets, laptops, personal computers, multimedia consoles, gaming consoles, set top boxes, and the like.

The one or more data storage devices 604 may include any non-volatile data storage device capable of storing data generated or employed within the computing system 600, such as computer executable instructions for performing a computer process, which may include instructions of both application programs and an operating system (OS) that manages the various components of the computing system 600. The data storage devices 604 may include, without limitation, magnetic disk drives, optical disk drives, solid state drives (SSDs), flash drives, and the like. The data storage devices 604 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 604 and/or the memory devices 606, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 600 includes one or more ports, such as an input/output (I/O) port 608, a communication port 610, and a sub-systems port 612, for communicating with other computing, network, or vehicle devices. It will be appreciated that the ports 608-612 may be combined or separate and that more or fewer ports may be included in the computer system 600.

The I/O port 608 may be connected to an I/O device, or other device, by which information is input to or output from the computing system 600. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 600 via the I/O port 608. Similarly, the output devices may convert electrical signals received from computing system 600 via the I/O port 608 into signals that may be sensed as output by a human, such as sound, light, and/or touch. The input device may be an alphanumeric input device, including alphanumeric and other keys for communicating information and/or command selections to the processor 602 via the I/O port 608. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 600 via the I/O port 608. For example, an electrical signal generated within the computing system 600 may be converted to another type of signal, and/or vice-versa. In one implementation, the environment transducer devices sense characteristics or aspects of an environment local to or remote from the computing device 600, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 600, such as, physical movement of some object (e.g., a mechanical actuator), heating or cooling of a substance, adding a chemical substance, and/or the like.

In one implementation, a communication port 610 is connected to a network by way of which the computer system 600 may receive network data useful in executing the methods and systems set out herein as well as transmitting information and network configuration changes determined thereby. Stated differently, the communication port 610 connects the computer system 600 to one or more communication interface devices configured to transmit and/or receive information between the computing system 600 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 610 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 610 may communicate with an antenna or other link for electromagnetic signal transmission and/or reception. In some examples, an antenna may be employed to receive Global Positioning System (GPS) data to facilitate determination of a location of a machine, vehicle, or another device.

The computer system 600 may include a sub-systems port 612 for communicating with one or more systems related to a vehicle to control an operation of the vehicle and/or exchange information between the computer system 600 and one or more sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, surface monitoring information and software and other modules and services may be embodied by instructions stored on the data storage devices 604 and/or the memory devices 606 and executed by the processor 602. The computer system 600 may be integrated with or otherwise form part of a vehicle. In some instances, the computer system 600 is a portable device that may be in communication and working in conjunction with various systems or sub-systems of a vehicle.

The present disclosure recognizes that the use of such information may be used to the benefit of users. For example, the location information of a vehicle may be used to provide targeted information concerning a "best" path or route to the vehicle and to avoid surface conditions. Accordingly, use of such information enables calculated control of an autonomous vehicle. Further, other uses for location information that benefit a user of the vehicle are also contemplated by the present disclosure.

Users can selectively block use of, or access to, personal data, such as location information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 6 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for surface monitoring, the system comprising:
    at least one light source emitting structured light, the at least one light source mounted to a vehicle and painting a line on a target surface ahead of the vehicle moving along a travel path, the line painted with the structured light;
    at least one imager disposed at a known distance from the line, the at least one imager capturing image data including an image of the line, the image of the line offset by a baseline corresponding to a nominal road surface; and
    a monitor determining a surface texture of the target surface based on deviation in the image of the line.

2. The system of claim 1, wherein the surface texture is reconstructed based on the deviation in the image of the line and triangulation.

3. The system of claim 1, wherein the deviation in the image of the line includes at least one of lateral or angular displacement.

4. The system of claim 1, wherein a coefficient of friction is determined for the target surface based on the surface texture.

5. The system of claim 1, wherein the at least one light source emits the structured light as a fan having a horizontal beam width extending in a first direction and forming a length of the line and a vertical beam width extending in a second direction traverse to the first direction and along the travel path.

6. The system of claim 1, wherein the surface texture includes at least one of a macro-texture of the target surface, a micro-texture, or one or more detected geometrical conditions.

7. The system of claim 1, wherein a surface profile is generated for the target surface by comparing the surface texture to a set of reference surface profiles each corresponding to a known surface condition.

8. One or more tangible non-transitory computer-readable storage media storing computer-executable instructions for performing a computer process on a computing system, the computer process comprising:
    receiving image data including an image of a line painted on a target surface ahead of a vehicle moving along a travel path, the line painted with structured light emitted by at least one light source, the image data captured with at least one imager disposed at a known distance from the line, the image of the line offset by a baseline corresponding to a nominal road surface;
    determining a surface texture of the target surface based on deviation in the image of the line; and
    determining an estimated coefficient of friction for the target surface based on the surface texture.

9. The one or more tangible non-transitory computer-readable storage media of claim 8, wherein the estimated coefficient of friction is determined based on a comparison of the surface texture to a set of reference surface profiles in at least one of power space or frequency space.

10. The one or more tangible non-transitory computer-readable storage media of claim 8, wherein determining the surface texture further includes applying at least one of a high pass filter or a low pass filter to the image of the line.

11. The one or more tangible non-transitory computer-readable storage media of claim 8, wherein the estimated coefficient of friction is determined by comparing a surface profile generated based on the surface texture to at least one of: one or more previous surface profiles each corresponding to a previous target surface along the travel path; a regression model constructed using training data and machine learning; or a set of reference friction metrics each corresponding to a known surface friction.

12. The one or more tangible non-transitory computer-readable storage media of claim 11, wherein the surface profile is generated by comparing the surface texture to a set of reference surface profiles each corresponding to a known surface condition.

13. The one or more tangible non-transitory computer-readable storage media of claim 8, wherein the deviation includes a projected vertical position of the line.

14. The one or more tangible non-transitory computer-readable storage media of claim 13, wherein the surface texture is reconstructed using a root mean square of the projected vertical position.

15. The one or more tangible non-transitory computer-readable storage media of claim 13, wherein a surface grade of the target surface is determined by comparing a slope of the projected vertical position to an inertia of the vehicle.

16. A method for surface monitoring, the method comprising:
    painting a line on a target surface ahead of a vehicle moving along a travel path, the line painted with structured light emitted by at least one light source;
    capturing an image of the line with at least one imager disposed at a known distance from the line, the at least one imager capturing the image of the line offset by a baseline corresponding to a nominal road surface; and
    determining a surface texture of the target surface based on deviation in the image of the line.

17. The method of claim 16, further comprising:
    subtracting ambient light from the image of the line through a plurality of exposures.

18. The method of claim 16, wherein the deviation includes a projected vertical position of the line.

19. The method of claim 16, wherein the surface texture includes at least one of a macro-texture of the target surface, a micro-texture, or one or more detected geometrical conditions.

20. The method of claim 16, wherein a surface profile is generated for the target surface by comparing the surface texture to a set of reference surface profiles each corresponding to a known surface condition.

* * * * *